US012623410B2

(12) United States Patent
Bailey et al.

(10) Patent No.: US 12,623,410 B2
(45) Date of Patent: May 12, 2026

(54) DYNAMIC PRINT INFILL ADJUSTMENT FOR DETERMINED STRESS POINTS

(71) Applicant: International Business Machines Corporation, Armonk, NY (US)

(72) Inventors: Logan Bailey, Atlanta, GA (US); Brian Narkinsky, Tallahassee, FL (US); Wesley Ip, Arlington, TX (US); Zachary A. Silverstein, Georgetown, TX (US); Alexandra M. Isaly, Lighthouse Point, FL (US)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 390 days.

(21) Appl. No.: 18/364,272

(22) Filed: Aug. 2, 2023

(65) Prior Publication Data

US 2025/0042092 A1　Feb. 6, 2025

(51) Int. Cl.
*B29C 64/393* (2017.01)
*G06T 7/11* (2017.01)
*G06T 17/00* (2006.01)
*B33Y 10/00* (2015.01)
*B33Y 50/02* (2015.01)

(52) U.S. Cl.
CPC .............. *B29C 64/393* (2017.08); *G06T 7/11* (2017.01); *G06T 17/00* (2013.01); *B33Y 10/00* (2014.12); *B33Y 50/02* (2014.12); *G06T 2207/20081* (2013.01)

(58) Field of Classification Search
CPC .................................................... B29C 64/393
See application file for complete search history.

(56) References Cited

U.S. PATENT DOCUMENTS

| | | | |
|---|---|---|---|
| 10,078,325 B2 | 9/2018 | Gunnarsson et al. | |
| 11,237,542 B2 | 2/2022 | Mark et al. | |
| (Continued) | | | |

FOREIGN PATENT DOCUMENTS

| | | |
|---|---|---|
| CN | 103978690 B | 5/2016 |

OTHER PUBLICATIONS

Song, Hyun Oh, et al. "Learning to detect visual grasp affordance." IEEE Transactions on Automation Science and Engineering 13.2 (2015): 798-809.

(Continued)

*Primary Examiner* — Suresh Suryawanshi
(74) *Attorney, Agent, or Firm* — Kelsey M. Skodje, Esq.; Kevin P. Radigan, Esq.; Heslin Rothenberg Farley & Mesiti P.C.

(57) ABSTRACT

Embodiments of the disclosure provide systems and methods for implementing 3D printing to manufacture 3D print objects with dynamic adjustment of 3D print infill specifications based on determined regions of stress points in a given 3D device design. A disclosed method comprises receiving a 3D object design for a 3D device to be printed; determining, based on the 3D object design and a trained model, a region of the 3D object with a projected likelihood of human interaction above a threshold likelihood; and generating, based on the determined region of the 3D object, instructions to selectively adjust one or more print infill specifications at the region.

20 Claims, 7 Drawing Sheets

200

3D PRINTER 202

3D PRINT OBJECT CONTROLLER 204

3D PRINT MODEL 206

ML TRAINED MODEL 208

SIMULATION ENVIRONMENT 210

3D PRINT SPLIICER SOFTWARE 212

DYNAMIC 3D PRINT INFILL CONTROL MODULE 182

(56) References Cited

U.S. PATENT DOCUMENTS

| | | | | | |
|---|---|---|---|---|---|
| 2011/0261049 | A1* | 10/2011 | Cardno | ................. | G06Q 40/04 |
| | | | | | 345/419 |
| 2016/0221266 | A1* | 8/2016 | Cronin | ................... | B33Y 50/00 |
| 2016/0346999 | A1* | 12/2016 | Patrov | ................... | B29C 64/106 |
| 2018/0104912 | A1* | 4/2018 | Bastian | ................. | B29C 64/112 |
| 2020/0156323 | A1* | 5/2020 | Woytowitz | ............. | B33Y 50/02 |
| 2020/0230888 | A1* | 7/2020 | Kim | ...................... | B29C 64/393 |
| 2020/0230945 | A1* | 7/2020 | Bastian | ................. | B29C 64/393 |
| 2022/0253576 | A1* | 8/2022 | Musuvathy | ............ | B33Y 50/02 |
| 2025/0214307 | A1* | 7/2025 | Kim | ...................... | B33Y 10/00 |

OTHER PUBLICATIONS

Yilmaz, Tufan Gürkan, et al. "Stress Analysis of Additive Manufactured Lightweight Spur Gears." ASME International Mechanical Engineering Congress and Exposition. vol. 85550. American Society of Mechanical Engineers, 2021 pp. 1-8.

Michell, Vaughan. (2016). 3D Printing and Additive Manufacturing Capability Modelling. 73-83. 10.5220/0006222400730083, published Jan. 2016.

Gopsill, James & Shindler, Jonathan & Hicks, Ben. (2018). Using finite element analysis to influence the infill design of fused deposition modelled parts. Progress in Additive Manufacturing. 3. 10.1007/s40964-017-0034-y.

Liu, Q., Xu, R., Zhou, Y., Ge, J., Yuan, S., Long, Y., & Shi, T. (2021). Metamaterials mapped lightweight structures by principal stress lines and topology optimization: Methodology, additive manufacturing, ductile failure and tests. Materials & Design, 212, 110192.

Joachim Stumpfe, "Digital platform for industrial 3D printing", https://web.archive.org/web/20201223215809/https://www.ibm.com/blogs/blockchain/2019/04/digital-platform-for-industrial-3d-printing/, Apr. 4, 2019, 6 pages.

* cited by examiner

100

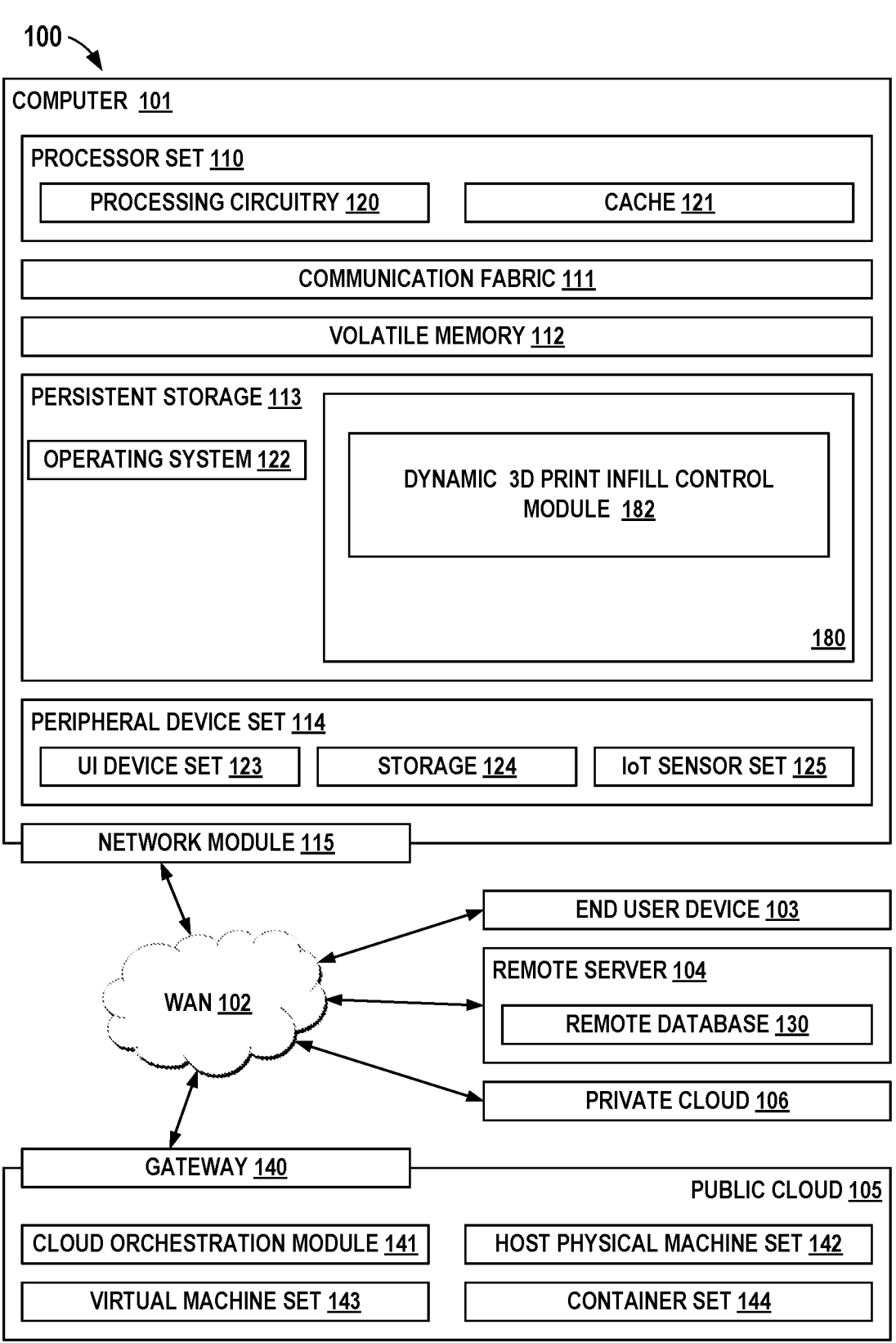

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DYNAMIC 3D PRINT INFILL CONTROL MODULE 182

180

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

3D PRINTER  <u>202</u>

3D PRINT OBJECT CONTROLLER  <u>204</u>

3D PRINT MODEL  <u>206</u>

ML TRAINED MODEL  <u>208</u>

SIMULATION ENVIRONMENT  <u>210</u>

3D PRINT SPLIICER SOFTWARE  <u>212</u>

DYNAMIC  3D PRINT INFILL CONTROL MODULE  <u>182</u>

FIG. 2

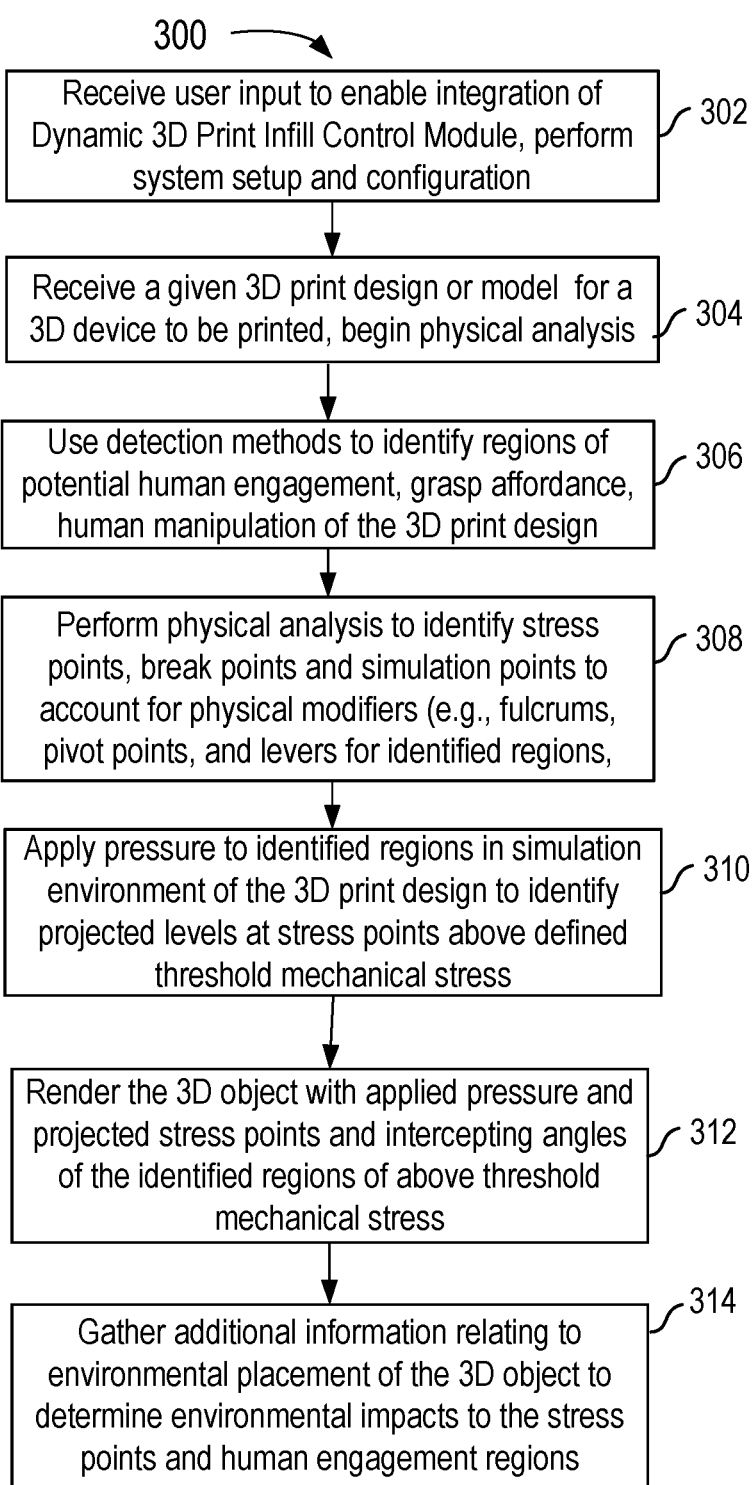

300

Receive user input to enable integration of Dynamic 3D Print Infill Control Module, perform system setup and configuration — 302

Receive a given 3D print design or model for a 3D device to be printed, begin physical analysis — 304

Use detection methods to identify regions of potential human engagement, grasp affordance, human manipulation of the 3D print design — 306

Perform physical analysis to identify stress points, break points and simulation points to account for physical modifiers (e.g., fulcrums, pivot points, and levers for identified regions, — 308

Apply pressure to identified regions in simulation environment of the 3D print design to identify projected levels at stress points above defined threshold mechanical stress — 310

Render the 3D object with applied pressure and projected stress points and intercepting angles of the identified regions of above threshold mechanical stress — 312

Gather additional information relating to environmental placement of the 3D object to determine environmental impacts to the stress points and human engagement regions — 314

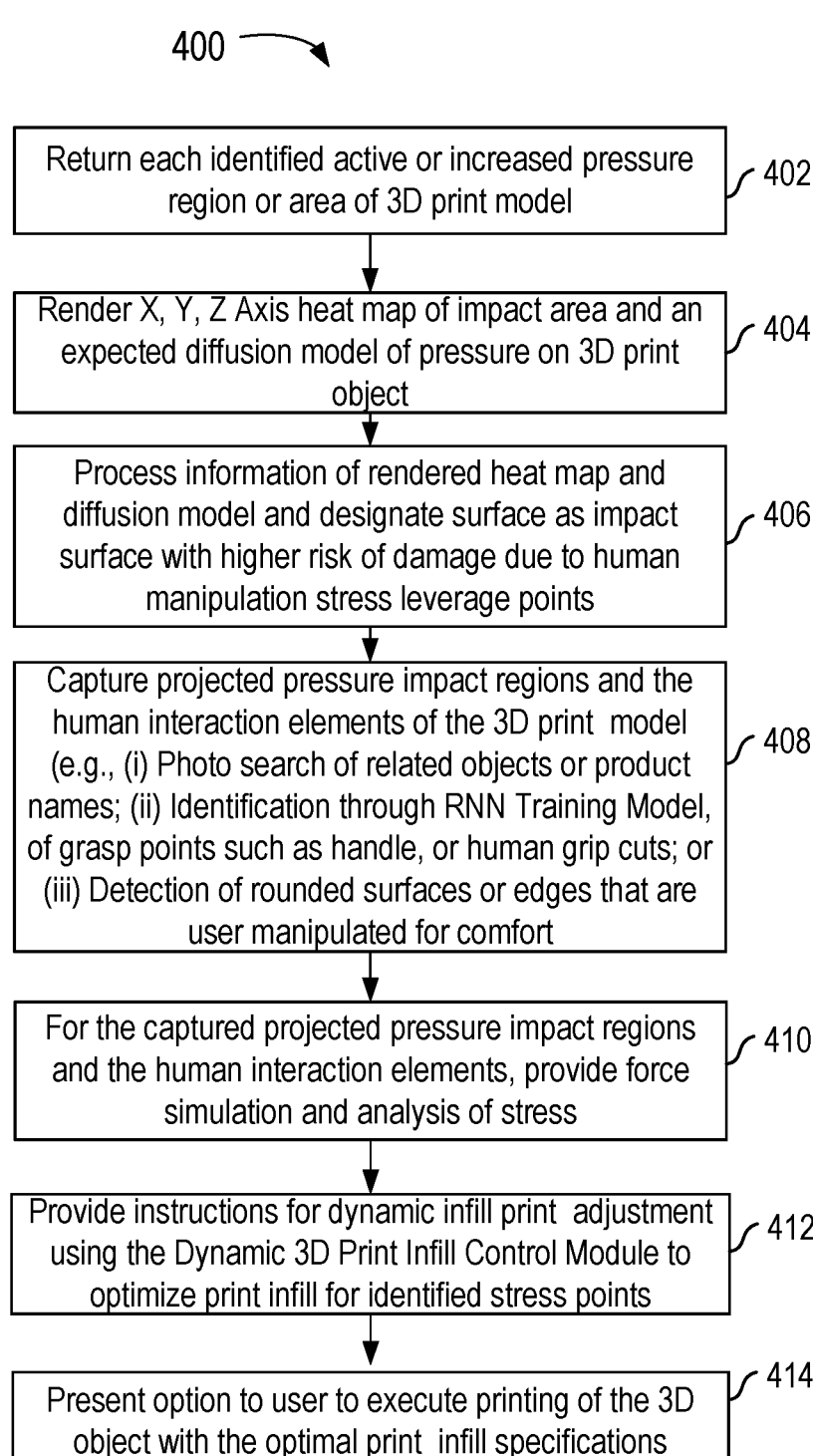

Return each identified active or increased pressure region or area of 3D print model — 402

Render X, Y, Z Axis heat map of impact area and an expected diffusion model of pressure on 3D print object — 404

Process information of rendered heat map and diffusion model and designate surface as impact surface with higher risk of damage due to human manipulation stress leverage points — 406

Capture projected pressure impact regions and the human interaction elements of the 3D print model (e.g., (i) Photo search of related objects or product names; (ii) Identification through RNN Training Model, of grasp points such as handle, or human grip cuts; or (iii) Detection of rounded surfaces or edges that are user manipulated for comfort — 408

For the captured projected pressure impact regions and the human interaction elements, provide force simulation and analysis of stress — 410

Provide instructions for dynamic infill print adjustment using the Dynamic 3D Print Infill Control Module to optimize print infill for identified stress points — 412

Present option to user to execute printing of the 3D object with the optimal print infill specifications — 414

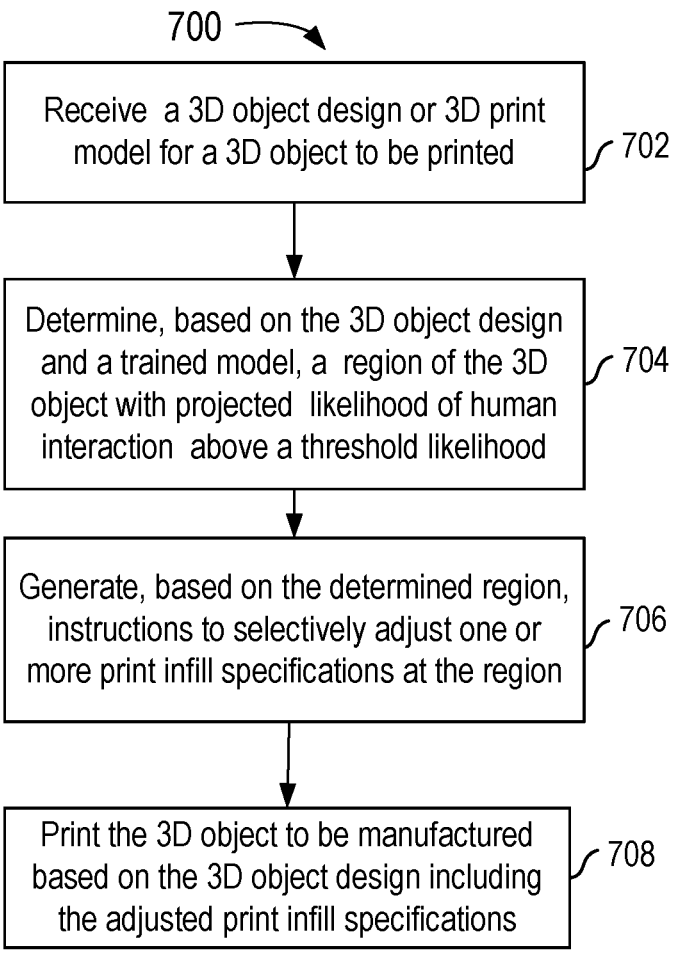

700

Receive a 3D object design or 3D print model for a 3D object to be printed ⟋ 702

Determine, based on the 3D object design and a trained model, a region of the 3D object with projected likelihood of human interaction above a threshold likelihood ⟋ 704

Generate, based on the determined region, instructions to selectively adjust one or more print infill specifications at the region ⟋ 706

Print the 3D object to be manufactured based on the 3D object design including the adjusted print infill specifications ⟋ 708

FIG. 7

DYNAMIC PRINT INFILL ADJUSTMENT FOR DETERMINED STRESS POINTS

BACKGROUND

The present invention relates to three-dimensional (3D) printing, and more specifically, methods and systems for implementing enhanced 3D printing including dynamically generating infill specifications at determined regions of potential stress points in a 3D object design.

3D printing or additive manufacturing is a process of making three-dimensional objects or devices from a digital file. Print infill specifications provide an internal structure of a 3D printed object or device referred to as 3D print infill, typically provided to save printing time and material usage, and to optimize part weight, strength, and printing time. Many different infill patterns exist including many different shapes. A 3D printing slicer software generates G-code to print a 3D model with a 3D printer; G-code is a widely used numerical control (NC) programming language. When designing 3D models and configuring infill design and density in 3D printing slicer software, often users must generate multiple G-code file iterations due to post print discovery of weak points in a given manufactured 3D object. A need exists for new techniques and systems to generate dynamic infill specifications unique to a determined region of potential stress points, related to factors such as grasp affordance and human manipulation tasks.

SUMMARY

Embodiments of the disclosure are directed to systems and methods for implementing 3D printing to manufacture 3D print objects with dynamic adjustment of 3D print infill specifications based on determined regions of stress points in a given 3D device design.

A disclosed non-limiting computer implemented method comprises receiving a 3D object design for a 3D device to be printed; determining, based on the 3D object design and a trained model, a region of the 3D object with a projected likelihood of human interaction above a threshold likelihood; and generating, based on the determined region of the 3D object, instructions to selectively adjust one or more print infill specifications at the region.

Other disclosed embodiments include a computer system and computer program product for implementing 3D printing to manufacture 3D print objects with dynamic adjustment of 3D print infill specifications based on determined stress points in a given 3D device design, implementing features of the above-disclosed method.

BRIEF DESCRIPTION OF THE DRAWINGS

FIG. 1 is a block diagram of an example computer environment for use in conjunction with one or more disclosed embodiments for implementing enhanced 3D printing to manufacture 3D objects with dynamically adjusting infill specifications to print at an identified region;

FIG. 2 is a block diagram of an example system for implementing enhanced 3D printing to manufacture 3D objects with dynamically adjusting infill specifications to print at an identified region of one or more embodiments of the present disclosure;

FIG. 3 is a flow chart of an example operations of an example method for implementing enhanced printing to manufacture 3D objects with dynamically adjusting infill specifications to print at an identified region of one or more embodiments of the present disclosure;

FIG. 4 is a flow chart of further example operations of an example method for dynamically adjusting infill specifications to print at identified regions of a given 3D print object of one or more embodiments of the present disclosure;

FIG. 7 is a flow chart of an example method for dynamically adjusting infill specifications of one or more embodiments of the present disclosure.

DETAILED DESCRIPTION

Figure 5:
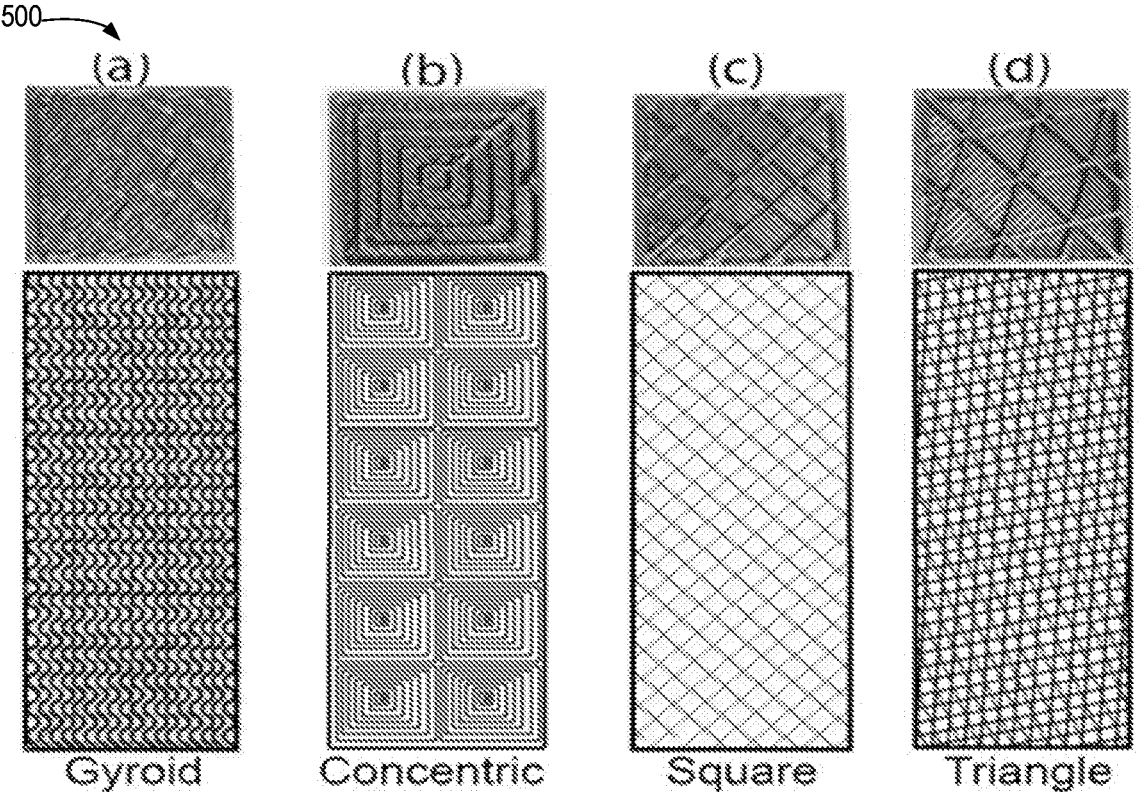
FIG. 5 illustrates example 3D print infill patterns for dynamically adjusting infill specifications to print at identified regions of a given 3D print object of one or more embodiments of the present disclosure.

Embodiments of the present disclosure provide systems and methods for implementing enhanced 3D printing to manufacture 3D objects with dynamically adjusting infill specifications (e.g., pattern, height, and density of infill) printed at an identified region of potential human interaction. Disclosed embodiments identify regions of potential human interaction, engagement or manipulation, and associated stress points, and break points, of a given 3D print object that are related to human scale manipulation tasks. In a disclosed embodiment, semantics or G-code print instructions related to print execution of infill specifications for a given 3D print object can be optimized in relation to factors such as grasp affordance and leverage break points.

In a disclosed embodiment, a 3D print infill control module detects a region having potential break points and related mechanical stress thresholds based on projected human interaction with a region of a 3D printed object. For example, consider a 3D printed object comprising a handle designed for spinning a cog. A 3D print infill control module identifies areas of the handle having stress points resulting from projected human interaction that may undergo mechanical stress above a defined threshold. The 3D print infill control module is integrated with 3D printer software, such as a slicer program, to generate instructions for adjusting one or more infill specifications, such as filament type, infill shape, pattern, height, and density, printed at an identified region of potential mechanical stress above a defined threshold. In a disclosed embodiment, the 3D print infill control module dynamically optimizes infill specifications for identified stress points, for example used to increase infill density relative to positional X, Y, Z coordinates specific to the identified stress points. In a disclosed embodiment, the 3D print infill control module may dynamically adjust 3D infill specifications to print G-code print specifications including infill patterns, density, extruder speed, layer height, filament type, and the like. In a disclosed embodiment, a 3D print infill control module optimizes 3D infill specifications by adjusting instructions for G-code print infill specifications for specific 3D object coordinates based on projected mechanical stresses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a Dynamic 3D Print Infill Control Module 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the disclosure provide systems and methods for implementing 3D printing to manufacture 3D print objects with dynamic adjustment of 3D print infill specifications based on determined stress points in a given 3D device design. In a disclosed embodiment, a 3D print infill control module identifies regions or areas of a given 3D device based on projected human interaction with the 3D printed object that may undergo mechanical stress exceeding a threshold. Disclosed embodiments identify regions of potential human interaction, engagement or manipulation, and associated stress points, and break points, of a given 3D print object that are related to human scale manipulation tasks. The 3D print infill control module is integrated with 3D printer software, such as a slicer program, to generate instructions for adjusting one or more infill specifications, such as infill shape, pattern, height, and density, printed at an identified region.

FIG. 2 illustrates an example system 200 for implementing enhanced 3D printing to manufacture 3D print objects with dynamic adjustment of 3D print infill specifications based on determined stress points in a given 3D device design of disclosed embodiments. System 200 can be used in conjunction with the computer 101 and the Dynamic 3D Print Infill Control Module 182 of FIG. 1 for implementing methods of the present disclosure. System 200 dynamically adjusts 3D print infill specifications in accordance with disclosed embodiments.

System 200 includes a 3D printer 202, which can implement enhanced 3D printing to manufacture 3D print objects using a 3D Print Object Controller 204, and a 3D Print Model 206 representing a 3D model in development to be printed. System 200 includes a Machine Learning (ML) Trained Model 208, such as a recurrent neural network (RNN) that is a type of artificial neural network, which uses sequential data or time series data, and uses training data to learn, using infill specifications and 3D model information from prior inputs to influence the current input and output. System 200 includes a Simulation Environment 210 used for rendering human interaction regions, such as detected visual grasp locations, grasp affordance, and simulation points including identified break points and stress points. System 200 retrieves a current 3D Model 206 in development and performs physical analysis the 3D model, for example using the Trained Model 208 and Simulation Environment 210 to identify an optimized combination of 3D print infill specifications for determined object regions in accordance with disclosed embodiments. System 200 includes a 3D Print Slicer Software 212, for example used with the 3D Print Object Controller 204 and the Dynamic 3D Print Infill Control Module 182 for generating dynamically adjusted 3D print infill specifications in accordance with disclosed embodiments.

FIG. 3 illustrates an example method 300 for implementing dynamic adjustment of 3D print infill specifications of disclosed embodiments. For example, in a disclosed embodiment, method 300 is implemented by system 200 including the Dynamic 3D Print Infill Control Module 182 and computer 101 in accordance with one or more disclosed embodiments of the present disclosure.

At block 302, system 200 receives a user input to enable use of the Dynamic 3D Print Infill Control Module 182, allowing computer aided design (CAD) and 3D printing modeler integration with the Dynamic 3D Print Infill Control Module 182. In some embodiments, initial operations at block 302 include system setup and configuration for the 3D printer 202 with an input received from a user for a 3D print model 206 to be manufactured and may include the Dynamic 3D Print Infill Control Module 182 being directly integrated with the slicing software, such as 3D Print Slicer Software 212.

At block 304, system 200 retrieves a current 3D object design or 3D print model 206 in development and begins physical analysis. For example, the 3D print model 206 may comprise a stereolithography (STL) file format, also called Standard Triangle Language, often used with CAD and 3D printing technologies. Alternatively for example, the current 3D print model 206 may comprise a G=code instructions, such as used with the 3D Print Slicer Software 212. In a disclosed embodiment, at block 306 system 200 uses known detections methods for detecting regions including potential human engagement locations, human manipulation areas, grasp affordance, potential break points, and the like. For example, system 200 identifies using image recognition data based on the 3D object design and the ML Trained Model 208, object-level appearance cues for estimation of grasp affordance and human engagement. In a disclosed embodiment, at block 306 system 200 performs physical analysis operations using 3D object information and data of the ML Trained Model 208 and existing datasets to identify regions where humans would likely engage or grasp objects and other potential human manipulation areas. At block 308, system 200 performs further physical analysis operations to identify stress points, break points, and simulation points to account for physical modifiers such as fulcrums, pivot points, and levers for the identified regions.

At block 310, system 200 applies pressure to the 3D model 208 in a simulated environment and performs further physical analysis operations. For example, system 200 applies pressure to the identified regions likely engaged or grasped or other potential human manipulation and perform physical analysis operations accounting for stress points, break points, and the physical modifiers including the fulcrums, pivot points, and levers to identify regions with projected mechanical stress above a defined threshold. At block 312, system 200 renders applied pressure other intercepting angles of the identified regions of the 3D model 208 having projected mechanical stress above the defined threshold. At block 314, system 200 optionally gathers or captures additional information related to the environmental placement of the 3D model 208 further to determine environmental impacts to the identified human engagement regions.

FIG. 4 illustrates further example operations of an example method 400 for dynamically adjusting infill specifications to print at identified regions of a given 3D print object of one or more embodiments of the present disclosure. In one embodiment, method 400 is carried out by system 200. At block 402, each active or pressure increased area of the 3D model 208 is returned in a selected one of a variety of manners. For example, at block 404, a heatmap is rendered using positional X, Y, Z coordinates specific to the identified stress points of an impact area including multiple potential identified regions of the 3D print model with projected mechanical stress exceeding a defined threshold. At block 404, an expected diffusion model of the pressure on the 3D print model is rendered for use to determine the degree or stress threshold for the identified regions of the 3D model. In machine learning, diffusion models or diffusion probabilistic models are generated to learn the latent structure of a dataset by modeling the way in which data points diffuse through latent space. At block 406, the information is processed and a surface is designated as an impact surface, which has a higher risk of damage, for example due to the human manipulation and leverage points.

At block 408, after capturing pressure areas for example by using human leverage break points, human interaction elements are captured. For example, the human interaction elements may be graphically or visually captured in a variety of ways; such as: (i) Photo search of related pieces or product names; (ii) Identification through the ML Trained Model 208 of grasp points such as a handle, or human grip cuts; or (iii) Detection of rounded surfaces or edges that can be manipulated for comfort by the user or the Dynamic 3D Print Infill Control Module 182. At block 410, for the captured pressure areas and the human interaction elements or potential interaction elements, force simulation and stress analysis are provided to identify optimal infill print adjustment using the Dynamic 3D Print Infill Control Module 182.

At block 412, one or more 3D print infill specifications are dynamically adjusted at projected human manipulation points, or expected human manipulation points, to adjust the 3D print model in accordance with disclosed embodiments. For example, system 200 optionally captures the 3D print model and manipulates the infill specifications at grasp and pressure points to provide an infill adjustment based on a desired strength of an area or device that has likely potential weakness based on the original user 3D print model script or the user's usage. System 200 dynamically adjusts one or more of the 3D print infill specifications to dynamically optimize print infill specifications to accommodate determined stress points above a defined threshold. For example, system 200 provides an infill specification adjustment of given shape or pattern of multiple different infill patterns, for example, one of a gyroid, concentric, square, triangle, honeycomb, or the like, at block 412.

Referring also to FIG. 5, example 3D print infill patterns 500 are illustrated, such as used for dynamically adjusting print infill specifications to print at identified regions of a given 3D print object of disclosed embodiments. As shown, the illustrated 3D print infill patterns 500 including (a) Gyroid, (b) Concentric, (c) Square, and (d) Triangle, provide examples of existing print infill patterns which can be selected for use in the adjustment of 3D print infill specifications of disclosed embodiments. For example, a specific 3D print infill patterns 500 can be selected based on its performance level and expected strength of a given 3D print filament type to provide an optimal dynamic adjustment of print infill specifications at identified regions of human interaction with the 3D print object.

In a disclosed embodiment, system 200 provides an infill specification adjustment of a given pattern with a selected infill density, for example, with higher density values selected to provide additional strength at identified regions of human interaction of the 3D print object to optimize the infill specifications for identified stress points, at block 412.

Figure 6:
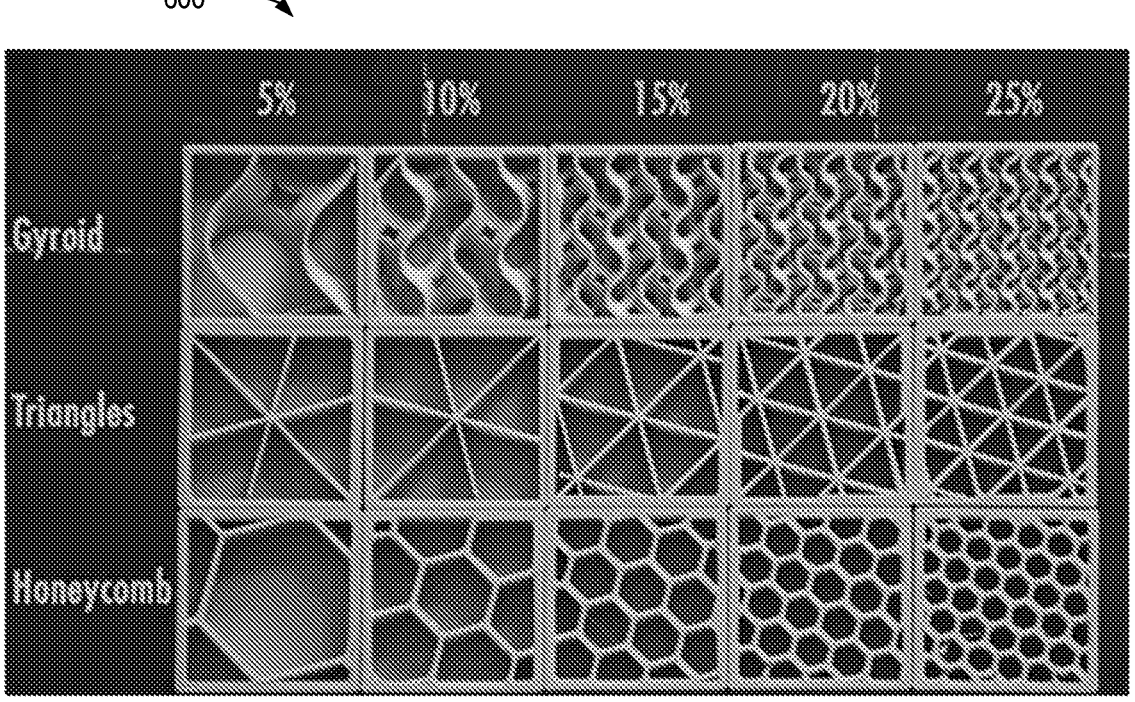
FIG. 6 illustrates example 3D print infill patterns with different example densities for dynamically adjusting infill specifications to print at identified regions of a given 3D print object of one or more embodiments of the present disclosure.

FIG. 6 illustrates example 3D print infill patterns 600 with different example densities used to print identified regions of a given 3D print object in accordance with the dynamically adjusted infill specifications of disclosed embodiments. As shown, the illustrated 3D print infill patterns 500 include Gyroid, Triangles, and Honeycomb with densities 5%, 10%, 15%, 20%, and 25%. For example, higher performance can be achieved by providing a higher density value with any of the illustrated 3D print infill patterns 500 being selected for identified regions of human interaction.

In a disclosed embodiment, system 200 provides an infill specification adjustment of given shape or pattern of multiple different infill patterns based on performance levels of the respective different infill patterns and expected strength of a given 3D print filament type. For example, system 200 dynamically adjusts one or a combination of 3D print infill specifications at projected human manipulation points, such as a selected filament or composite filaments, or no change in the filament material other than the density of the infill print, or a selected infill pattern based on an expected applied force, such as a triangle, square, concentric or other different infill patterns that enable adjusting or increasing density.

At block 414, system 200 enables the user to agree or opt-in to the execution of printing of an enhanced, resilient 3D object as provided by the optimal dynamic adjustment of one or more 3D print infill specifications of disclosed embodiments. When enabled, an enhanced, resilient 3D object including the optimize infill specifications at regions of the projected human manipulation points.

FIG. 7 illustrates an example operation of a method 700 (e.g., by system 200 of FIG. 2 and the Dynamic 3D Print Infill Control Module 182 of FIG. 1) for dynamically adjusting infill specifications of one or more embodiments of the present disclosure. As indicated at block 702, a 3D object design (e.g., 3D print model 206) for a 3D object to be printed is received. In a disclosed embodiment, the 3D object design includes various formats; for example, G-code instructions of a given 3D printing slicer software representing the 3D object to be printed.

At block 704, based on the 3D object design and a trained model, a region of the 3D object with a projected likelihood of human interaction above a threshold likelihood is determined. In a disclosed embodiment, the trained model comprises a ML Trained Model 208, such as an RNN trained model using prior training information of infill specifications and 3D print models. In a disclosed embodiment, applied force simulation and stress analysis are performed to identify optimal infill print specification adjustments at the determined regions, for example correcting design flaws of the current 3D object design. At block 706, based on the determined region of the 3D object, instructions to adjust one or more print infill specifications at the region are generated. For example, block 706 may include dynamically adjusting one or a combination of 3D print infill specifications at the region of projected human manipulation points, such as a selected filament, a composite filament, a selected infill pattern and a selected print infill density, such as a triangle, square, concentric or other different infill patterns that enable adjusting and increasing density. In a disclosed embodiment, system 200 selectively adjusts one or more print infill specifications at the region by generating instructions to print at the region a given print infill pattern based on a determined performance level of the given print infill pattern with a given 3D print filament type. At block 708, the 3D object to be manufactured based on the 3D object design including the adjusted print infill specifications is printed.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a 3D object design for a 3D object to be printed;
determining, using image recognition data based on the 3D object design and a trained machine learning (ML) model, object-level appearance cues that indicate one or more regions of the 3D object with a projected likelihood of human interaction above a threshold likelihood, wherein the determining comprises:
performing physical analysis to identify one or more stress points, break points, or simulation points within the one or more regions of the 3D object; and
performing physical analysis to identify a projected mechanical stress threshold at the one or more stress points, break points, or simulation points within the one or more regions; and
generating, based on the projected mechanical stress threshold at the one or more stress points, break points, or simulation points, instructions to adjust one or more print infill specifications within the one or more regions.

2. The method of claim 1, wherein receiving the 3D object design for the 3D object to be printed further comprises receiving a G-code file representing the 3D object to be printed.

3. The method of claim 1, wherein determining the object-level appearance cues further comprises performing physical analysis to identify an estimation of grasp affordance and human engagement within the one or more regions.

4. The method of claim 1, wherein the one or more stress points, break points, or simulation points within the one or more regions comprise at least one location of potential human engagement, human manipulation or grasp object.

5. The method of claim 1, wherein performing physical analysis operations to identify the one or more of stress points, break points, or simulation points further comprises identifying one or more of fulcrums, pivot points, and levers, to identify the projected mechanical stress threshold.

6. The method of claim 1, wherein determining the object-level appearance cues further comprises rendering applied pressure in a simulation at the identified regions with the projected mechanical stress threshold.

7. The method of claim 1, wherein determining, the object-level appearance cues further comprises rendering and processing a heatmap of the one or more regions to determine mechanical stress points above a defined threshold of the 3D print model.

8. The method of claim 1, wherein generating, based on determining the region of the 3D object, instructions to adjust one or more print infill specifications within the or more regions further comprises generating instructions to print within the or more regions, a given print infill pattern based on a determined performance level of the given print infill pattern with a given 3D print filament.

9. The method of claim 1, wherein generating the instructions to adjust one or more print infill specifications within the or more regions further comprises generating instructions to print a given print infill pattern with a selected print infill density within the one or more regions.

10. The method of claim 1, wherein generating the instructions to adjust one or more print infill specifications within the or more regions further comprises generating instructions to print one or a combination of one or more of a selected filament, a selected composite filament, a selected infill pattern or an infill density within the one or more regions.

11. A system, comprising:
a processor; and
a memory, wherein the memory includes a computer program product configured to perform operations for implementing 3D printing to manufacture a 3D object, the operations comprising:
determining, using image recognition data based on the 3D object design and a trained machine learning (ML) model, object-level appearance cues that indicate one or more regions of the 3D object with a projected likelihood of human interaction above a threshold likelihood, wherein the determining comprises:
performing physical analysis to identify one or more stress points, break points, or simulation points within the one or more regions of the 3D object; and
performing physical analysis to identify a projected mechanical stress threshold at the one or more stress points, break points, or simulation points within the one or more regions; and
generating, based on the projected mechanical stress threshold at the one or more stress points, break points, or simulation points, instructions to adjust one or more print infill specifications within the one or more regions.

12. The system of claim 11, wherein receiving the 3D object design for the 3D object to be printed further comprises receiving a G-code file representing the 3D object to be printed.

13. The system of claim 11, wherein the one or more stress points, break points, or simulation points within the one or more regions comprise at least one location of potential human engagement, human manipulation or grasp object.

14. The system of claim 11, wherein performing physical analysis operations to identify the one or more of stress points, break points, or simulation points further comprises identifying one or more of fulcrums, pivot points, and levers, to identify the projected mechanical stress threshold.

15. The system of claim 11, wherein generating the instructions to adjust one or more print infill specifications within the or more regions further comprises generating instructions to print one or a combination of one or more of a selected filament, a selected composite filament, a selected infill pattern or an infill density within the one or more regions.

16. A computer program product for implementing 3D printing to manufacture a 3D object, the computer program product comprising:

a computer-readable storage medium having computer-readable program code embodied therewith, the computer-readable program code executable by one or more computer processors to perform an operation comprising:

determining, using image recognition data based on the 3D object design and a trained machine learning (ML) model, object-level appearance cues that indicate one or more regions of the 3D object with a projected likelihood of human interaction above a threshold likelihood, wherein the determining comprises:

performing physical analysis to identify one or more stress points, break points, or simulation points within the one or more regions of the 3D object; and performing physical analysis to identify a projected mechanical stress threshold at the one or more stress points, break points, or simulation points within the one or more regions; and generating, based on the projected mechanical stress threshold at the one or more stress points, break points, or simulation points, instructions to adjust one or more print infill specifications within the one or more regions.

17. The computer program product of claim 16, wherein receiving the 3D object design for the 3D object to be printed further comprises receiving a G-code file representing the 3D object to be printed.

18. The computer program product of claim 16, wherein the one or more stress points, break points, or simulation points within the one or more regions comprise at least one location of potential human engagement, human manipulation or grasp object.

19. The computer program product of claim 16, wherein performing physical analysis operations to identify the one or more of stress points, break points, or simulation points further comprises identifying one or more of fulcrums, pivot points, and levers, to identify the projected mechanical stress threshold.

20. The computer program product of claim 16, wherein generating the instructions to adjust one or more print infill specifications within the or more regions further comprises generating instructions to print one or a combination of one or more of a selected filament, a selected composite filament, a selected infill pattern or an infill density within the one or more regions.

* * * * *